US012759633B2

(12) United States Patent
Wood et al.

(10) Patent No.: US 12,759,633 B2
(45) Date of Patent: Oct. 13, 2026

(54) STEERING ASSISTANCE ALTERATIONS IN ACCORDANCE WITH VEHICLE PARAMETERS

(71) Applicant: Textron Inc., Providence, RI (US)

(72) Inventors: Baily Guyton Wood, Dublin, GA (US); Trevor Douglas Roebuck, Evans, GA (US); Charles Daniel Dauchess, North Augusta, SC (US); Ricky Veldee Kemp, Augusta, GA (US)

(73) Assignee: TEXTRON INNOVATIONS INC., Providence, RI (US)

( * ) Notice: Subject to any disclaimer, the term of this patent is extended or adjusted under 35 U.S.C. 154(b) by 22 days.

(21) Appl. No.: 18/966,711

(22) Filed: Dec. 3, 2024

(65) Prior Publication Data

US 2026/0152231 A1 Jun. 4, 2026

(51) Int. Cl.
*B62D 15/02* (2006.01)

(52) U.S. Cl.
CPC .................................. *B62D 15/025* (2013.01)

(58) Field of Classification Search
CPC .................................................... B62D 15/025
USPC ...................................................... 701/41–44
See application file for complete search history.

(56) References Cited

U.S. PATENT DOCUMENTS 3,983,953 A 10/1976 Bayle
4,499,964 A 2/1985 Abe et al.
4,538,698 A 9/1985 Hashimoto et al.
4,557,343 A 12/1985 Pickering
4,574,903 A 3/1986 Hashimoto et al.
4,577,716 A 3/1986 Norton
4,593,358 A 6/1986 Takeshima et al.
4,626,994 A 12/1986 Yabe et al.
4,651,840 A 3/1987 Shimizu et al.
4,685,528 A 8/1987 Suzuki et al.
4,687,976 A 8/1987 Shimizu
4,693,332 A 9/1987 Miyata et al.
4,702,335 A 10/1987 Cage et al.
4,741,408 A 5/1988 Bausch et al.
4,762,194 A 8/1988 Morishita et al.
4,800,974 A 1/1989 Wand et al.
4,939,436 A 7/1990 Morishita et al.
5,238,079 A 8/1993 Gorim
5,253,728 A 10/1993 Matsuno et al.
5,473,231 A * 12/1995 McLaughlin ............ B62D 6/10
318/432
5,568,389 A 10/1996 McLaughlin et al.
(Continued)

*Primary Examiner* — Hai H Huynh
*Assistant Examiner* — Johnny H Hoang
(74) *Attorney, Agent, or Firm* — Foley & Lardner LLP

(57) ABSTRACT

A golf vehicle system includes a golf vehicle and a controller. The golf vehicle includes a chassis, a prime mover, a steering system, a plurality of tractive elements, and a sensor. The steering system includes a steering wheel and a power assist system configured to provide steering assistance to the steering wheel. The control system is configured to acquire the golf vehicle parameter, generate a countermeasure based on the golf vehicle parameter, and provide a signal to the power assist system to implement the countermeasure. The golf vehicle parameter includes at least one of (a) a motion characteristic, (b) a distance or a relative location between the golf vehicle and a portion of a golf course, or (c) an input to the steering wheel. The countermeasure is a change in the steering assistance provided to the steering wheel.

20 Claims, 8 Drawing Sheets

(56) References Cited

U.S. PATENT DOCUMENTS

| | | | | |
|---|---|---|---|---|
| 5,992,558 | A | 11/1999 | Noro et al. | |
| 6,015,023 | A | 1/2000 | Mukai et al. | |
| 6,116,372 | A | 9/2000 | Mukai et al. | |
| 6,152,255 | A | 11/2000 | Noro et al. | |
| 6,422,335 | B1 | 7/2002 | Miller | |
| 6,926,112 | B2 * | 8/2005 | Husain | B62D 6/008 180/444 |
| 8,768,571 | B2 * | 7/2014 | Yamashita | B62D 5/0484 318/434 |
| 8,788,147 | B2 * | 7/2014 | Strecker | G01L 5/221 180/443 |
| 12,207,166 | B2 * | 1/2025 | Li | H04M 3/51 |
| 2016/0121924 | A1 * | 5/2016 | Norstad | B62D 5/0481 701/41 |
| 2024/0182107 | A1 * | 6/2024 | Gatten | B62D 6/002 |
| 2024/0326908 | A1 * | 10/2024 | Smith | B62D 12/00 |

* cited by examiner

STEERING ASSISTANCE ALTERATIONS IN ACCORDANCE WITH VEHICLE PARAMETERS

BACKGROUND

Vehicles may include power steering, a system that assists a driver in turning a steering wheel and maneuvering the vehicle. Conventional power steering systems provide the same level of assistance at all speeds, resulting in instability at high speeds or low power steering at low speeds.

SUMMARY

One embodiment relates to a golf vehicle system. The golf vehicle system includes a golf vehicle and a control system. The golf vehicle includes a chassis, a prime mover, a steering system, a plurality of tractive elements, and a sensor. The steering system includes a steering wheel and a power assist system configured to provide steering assistance to the steering wheel. At least one of the plurality of tractive elements is configured to be pivoted by the steering system. The first sensor is configured to facilitate detecting a golf vehicle parameter. The control system is configured to acquire the golf vehicle parameter, generate a countermeasure based on the golf vehicle parameter, and provide a signal to the power assist system to implement the counter measure. The golf vehicle parameter includes at least one of (a) a motion characteristic, (b) a distance or a relative location between the golf vehicle and a portion of a golf course, or (c) an input to the steering wheel. The countermeasure includes a change in the steering assistance provided to the steering wheel.

Another embodiment relates to a vehicle system. The vehicle system includes a non-transitory computer-readable medium having instructions stored thereon that, when executed by one or more processors, cause one or more processors to acquire a golf vehicle parameter, generate a countermeasure to change a steering assistance provided to the steering wheel based on the golf vehicle parameter, and implement the countermeasure. The golf vehicle parameter includes at least one of (a) a motion characteristic, (b) a distance or a relative location between a golf vehicle and a portion of a golf course, or (c) an input to a steering wheel. Implementing the countermeasure includes adjusting the steering assistance when at least one of (a) the motion characteristic or (b) the input is greater than a threshold and adjusting the steering assistance of the steering wheel to prevent the golf vehicle from leaving a path of the golf course or to direct the golf vehicle towards the path.

Still another embodiment relates to a vehicle system. The vehicle system includes a non-transitory computer-readable medium having instructions stored thereon that, when executed by one or more processors, cause the one or more processors to acquire a golf vehicle parameter, acquire player information, generate a countermeasure based on the player information and the golf vehicle parameter, implement the countermeasure, and deactivate the steering assistance when the golf vehicle is powered off. The golf vehicle parameter includes at least one of (a) a motion characteristic, (b) a distance or relative location between a golf vehicle and a portion of a golf course, or (c) an input to a steering wheel. The countermeasure includes a change in steering assistance provided to the steering wheel. The countermeasure includes increasing the steering assistance based on the player information.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
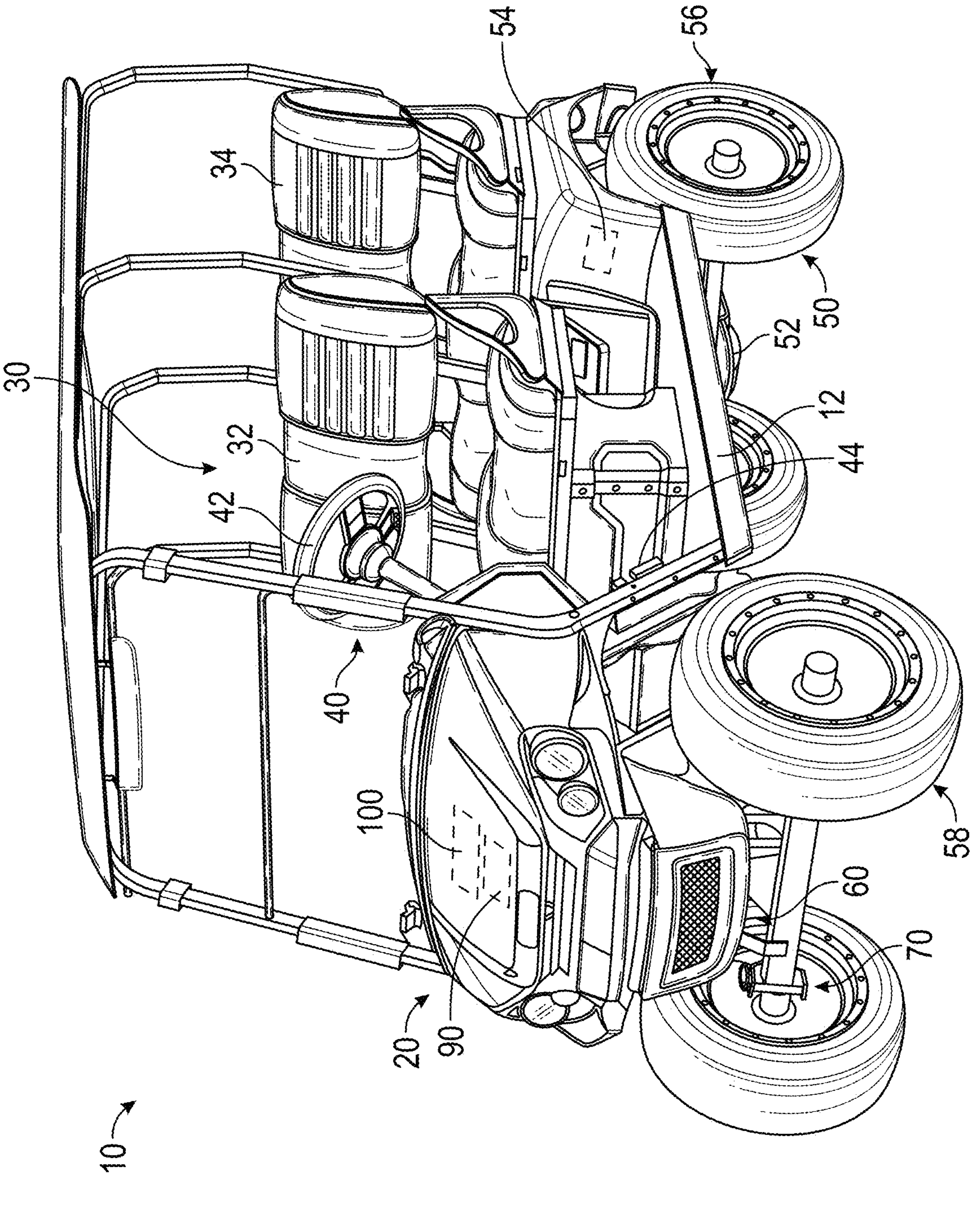
FIG. 1 is a perspective view of a vehicle, according to an exemplary embodiment.
Figure 2:
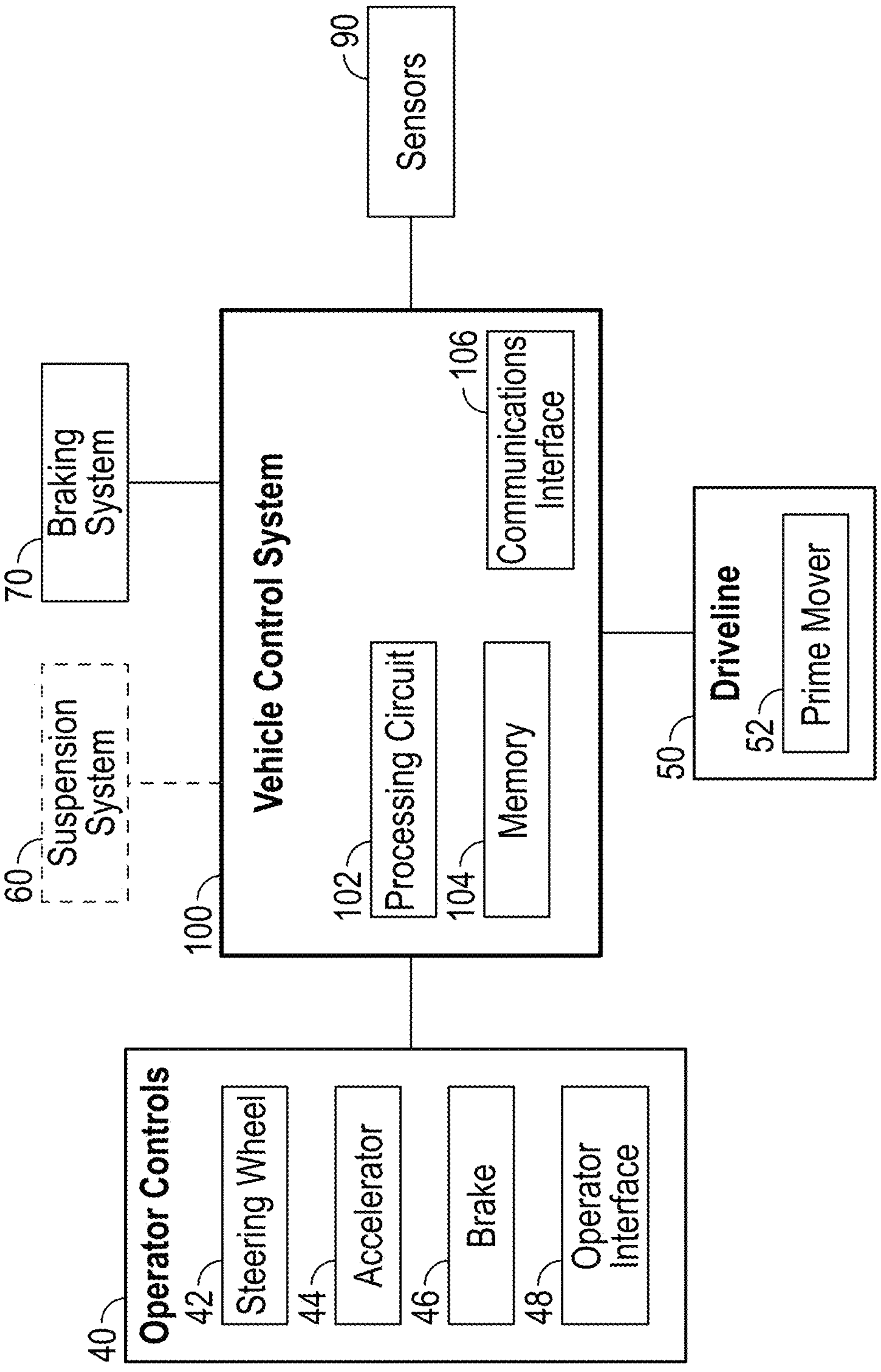
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a control system, shown as vehicle control system 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart or vehicle, an all-terrain vehicle ("ATV"), a utility task vehicle ("UTV"), a low speed vehicle ("LSV"), a personal transport vehicle ("PTV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course).

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor (e.g., the motor 53) and the energy storage 54 is a battery system (e.g., the battery module 57, the add-on battery module(s) 59, etc.). In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some embodiments, electric regenerative braking is employed (e.g., via the prime mover 52, an electric motor, etc.) in combination with or instead of using the braking system 70 to facilitate braking of one or more components of the driveline 50.

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), an inertial measurement unit ("IMU"), suspension sensor(s), wheel sensors, an audio sensor or microphone, a camera, an optical sensor, a proximity detection sensor, a Doppler sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle control system 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle control system 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle control system 100 may represent a collection of processing devices. In such cases, the processing circuit 102 represents the collective processors of the devices, and the memory 104 represents the collective storage devices of the devices.

In one embodiment, the vehicle control system 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle control system 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle control system 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Electrified Driveline

Figure 3:
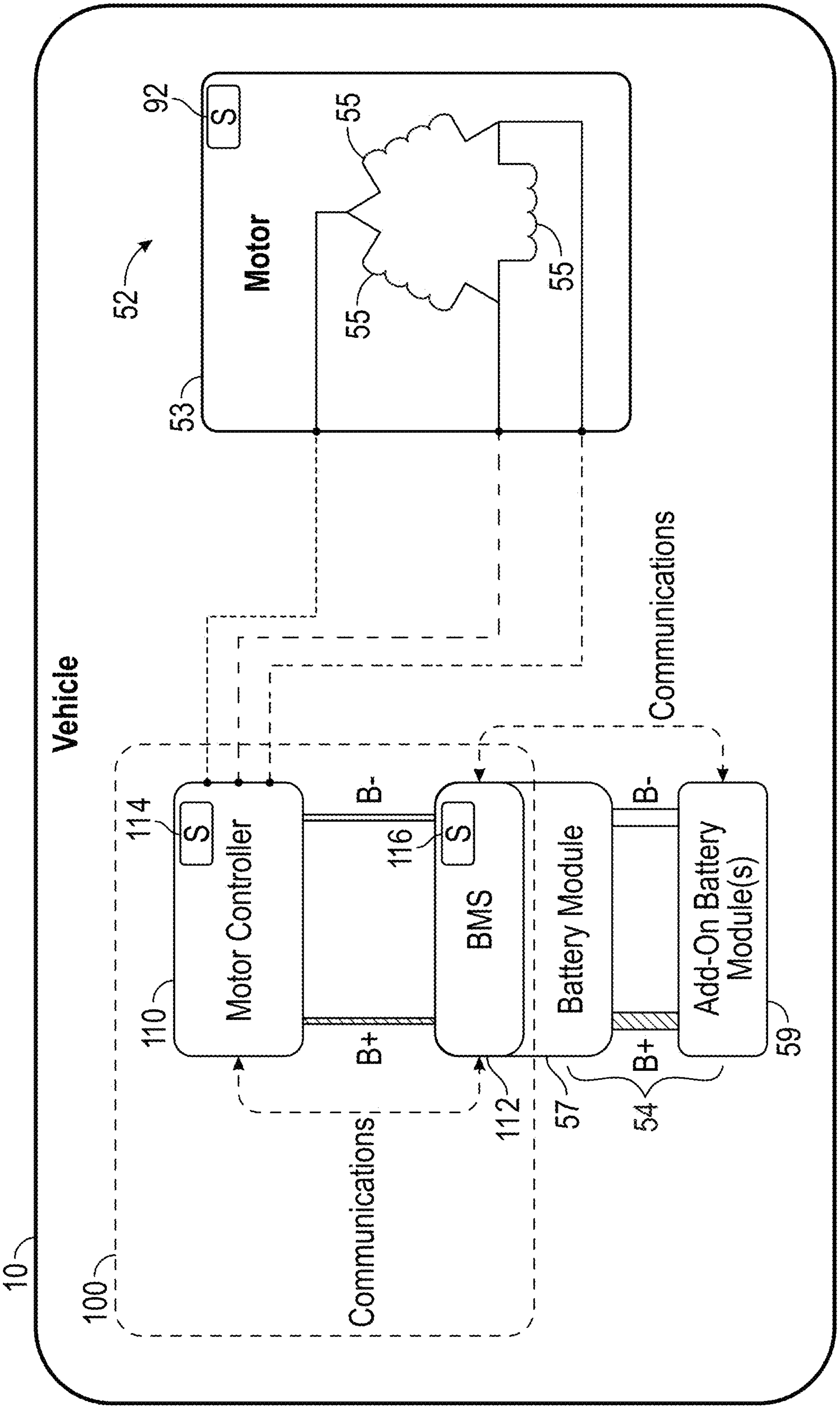
FIG. 3 is another schematic block diagram of the vehicle of FIG. 1, according to an exemplary embodiment.

According to the exemplary embodiments shown in FIG. 3, the driveline 50 of the vehicle 10 is configured as an electrified driveline where (a) the prime mover 52 is configured as a three-phase, alternating current ("AC") electric motor, shown as motor 53, including three sets of windings, shown as motor windings 55, and a first sensor, shown as motor sensor 92; (b) the energy storage 54 is configured as a battery system including a first battery pack or module, shown as battery module 57, and one or more second battery packs or modules, shown as add-on battery module(s) 59, electrically coupled to the battery module 57 in parallel; and (c) the vehicle control system 100 includes (i) a first controller, shown as motor controller 110, coupled to the motor 53 and including a second sensor, shown as motor controller sensor 114, and (ii) a second controller, shown as battery management system ("BMS") 112, coupled to the motor controller 110 and the energy storage 54 (e.g., the battery system, the battery module 57, the add-on battery module(s) 59, etc.) and including a third sensor, shown as BMS sensor 116. In some embodiments, the motor 53 is configured as a separately excited DC motor. The motor sensor 92, the motor controller sensor 114, and/or the BMS sensor 116 may include a temperature sensor, a voltage sensor, a current sensor, a speed sensor, and/or another suitable sensor to facilitate monitoring at least one of the operational parameters (e.g., temperature, voltage, current, speed, SOC, rate of charge, rate of discharge, etc.) of the motor 53, the motor controller 110, the BMS 112, the battery module 57, and/or the add-on battery modules(s) 59. The motor controller 110 and the BMS 112 may each include a processing circuit 102, a memory 104, and a communications interface 106.

According to an exemplary embodiment, each of the battery module 57 and the add-on battery module(s) 59 of the battery system includes one or more rows and/or groups of battery cells. The BMS 112 may be configured to monitor characteristics of the rows and/or groups of battery cells and/or individual cells of the battery module 57 and the add-on battery module(s) 59 (e.g., using data acquired by the BMS sensor 116) including, but not limited to, voltage, temperature, current, and state of charge ("SOC"). The BMS 112 may also be configured to provide direct current ("DC") power from the battery system to the motor controller 110 to power the motor 53 based on driving demands of the vehicle 10.

According to an exemplary embodiment, the motor controller 110 is configured to manage the power supplied to the motor 53. By way of example, the motor controller 110 may be configured to modulate the voltage, current, phase, and/or frequency of the power sent to the motor windings 55, which can influence the torque and speed output provided by the motor 53. In some embodiments, the motor controller 110 is configured to control a type of power, AC power or DC power, delivered to the motor 53. By way of example, the motor controller 110 may be configured to convert the type of power from DC power to AC power and/or regulate the AC power or DC power depending on the intended function of the motor 53. The motor controller 110 may include components to invert, convert, or otherwise modulate DC power and/or AC power.

As shown in FIG. 3, the energy storage 54 is configured to supply (e.g., via electrical wiring, electrical connections, etc.) DC power to the motor controller 110. In some embodiments, the DC power flows from the energy storage 54, through the BMS 112, and to the motor controller 110. The BMS 112 and the motor controller 110 may include communication interfaces (e.g., communications interfaces 106) that facilitate exchanging data related to operational status, command signals, and feedback therebetween. The BMS 112 and the add-on battery module 59 (e.g., a BMS thereof) may include communication interfaces that facilitate exchanging data related to operational status, command signals, and feedback therebetween. The add-on battery module(s) 59 is(are) configured to provide additional battery cells and increase the total energy storage capacity of the energy storage 54. As shown in FIG. 3, the battery module 57 and the add-on battery module(s) 59 are connected in parallel (e.g., via wires, connection busses, etc.) to provide for a pathway of electrical transfer. In other embodiments, the battery module 57 and the add-on battery module(s) 59 are connected in series.

According to an exemplary embodiment, the BMS 112 is configured to monitor (e.g., continuously, periodically, etc.) various parameters of the energy storage 54, including voltage, current, and temperature of each cell, rows/groups, and/or module within the energy storage 54. In some embodiments, the BMS 112 is configured to calculate or otherwise determine the SOC of the energy storage 54, the battery module 57, and/or the add-on battery module(s) 59. In some embodiments, the BMS 112 is configured to redistribute charge among the cells, rows/groups, and/or the modules to ensure an equal or substantially equal charge level throughout the energy storage 54. The BMS 112 can communicate with other systems or components or the vehicle 10 or with external devices (e.g., the remote systems 240) to report on battery status and diagnostics and/or to receive control commands.

According to an exemplary embodiment, the BMS 112 is configured to detect faults or failures in the energy storage 54 that may potentially lead to or that have caused an overcharge condition and, thereby, a thermal runaway event. By way of example, the BMS 112 may be configured to monitor the voltage of individual cells, rows/groups, or modules of the energy storage 54, and when deviations from normal voltage levels occur beyond a nominal range, the BMS 112 may determine that a fault or failure is present and that there is a potential for an overcharge condition or that there is an actual overcharge condition. In some implementations, the BMS 112 is configured to detect voltage imbalance or voltage imbalance trends. By way of another example, the BMS 112 may additionally or alternatively be configured to monitor current flows during charging and discharging of the energy storage 54 and identify unexpected fluctuations in current that may indicate that a fault or failure is present and that there is a potential for an overcharge condition or that there is an actual overcharge condition. By way of still another example, the BMS 112 may additionally or alternatively be configured to monitor the temperature of the cells, rows/groups, and/or modules of the energy storage 54 and identify anomalously high temperatures that may indicate that a fault or failure is present and that there is a potential for an overcharge condition or that there is an actual overcharge condition. It should be understood that the above example of detecting faults, failures, or overcharge conditions is provided for example purposes only and is not exhaustive. Other methods or techniques may be implemented to detect faults, failures, or overcharge conditions, which are intended to be included within the scope of the present disclosure. Additional details regarding fault detection regarding the energy storage 54 is described in greater detail herein. Further details regarding fault detection, including voltage imbalance, may be found in U.S. patent application Ser. No. 18/884,363, filed Sep. 13, 2024, which is incorporated herein by reference in its entirety.

Fleet Monitoring and Control System

Figure 4:
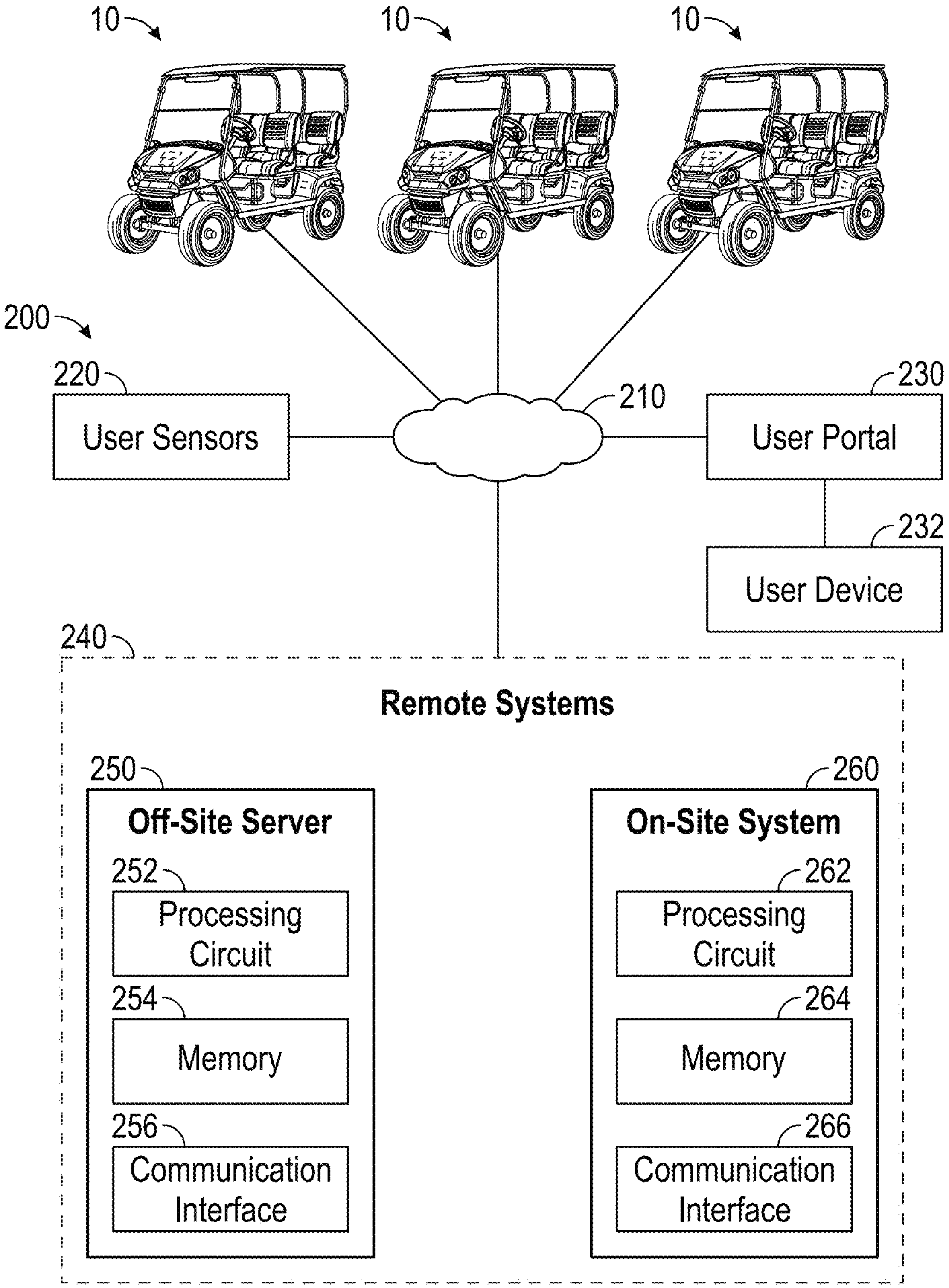
FIG. 4 is a schematic block diagram of a fleet monitoring and control system including a plurality of the vehicles of FIG. 1, according to an exemplary embodiment.

As shown in FIG. 4, a site monitoring and control system, shown as fleet monitoring and control system 200, includes one or more vehicles 10; one or more second sensors, shown as user sensors 220, positioned remote or separate from the vehicles 10; an operator interface, shown as user portal 230, positioned remote or separate from the vehicles 10; an external or remote user device, shown as user device 232, positioned remote or separate from the vehicles 10; and one or more external processing systems, shown as remote systems 240, positioned remote or separate from the vehicles 10. The vehicles 10, the user sensors 220, the user portal 230, and the remote systems 240 communicate via one or more communications protocols (e.g., Bluetooth, Wi-Fi, cellular, radio, through the Internet, etc.) through a network, shown as communications network 210. In some embodiments, the fleet monitoring and control system 200 does not includes the user portal 230 and/or the user device 232.

The user sensors 220 may be or include one or more sensors that are carried by or worn by an operator of one of the vehicles 10. By way of example, the user sensors 220 may be or include a wearable sensor (e.g., a smartwatch, a fitness tracker, a pedometer, a heart rate monitor, etc.) and/or a sensor that is otherwise carried by the operator (e.g., a smartphone, etc.) that facilitates acquiring and monitoring operator data (e.g., physiological conditions such a temperature, heartrate, breathing patterns, etc.; location; movement; etc.) regarding the operator. The user sensors 220 may communicate directly with the vehicles 10, directly with the remote systems 240, and/or indirectly with the remote systems 240 (e.g., through the vehicles 10 as an intermediary).

The user portal 230 may be configured to facilitate operator access to dashboards including the vehicle data, the operator data, information available at the remote systems 240, etc. to manage and operate the site (e.g., golf course) such as for advanced scheduling purposes, to identify persons breaking course guidelines or rules, to monitor locations of the vehicles 10, etc. The user portal 230 may also be configured to facilitate operator implementation of configurations and/or parameters for the vehicles 10 and/or the site (e.g., setting speed limits, setting geofences, etc.). As shown in FIG. 4, the user portal 230 is accessible via the user device 232. The user device 232 may be or include a computer, laptop, smartphone, tablet, or the like. The user portal 230 and the user device 232 may communicate via one or more communications protocols (e.g., Bluetooth, Wi-Fi, cellular, radio, through the Internet, wired connection, etc.) through a network (e.g., a CAN bus, the communications network 210, etc.). The user device 232 includes a display (e.g., a screen, etc.) configured to display one or more graphical user interfaces ("GUIs") of the user portal 230.

As shown in FIG. 4, the remote systems 240 include a first remote system, shown as off-site server 250, and a second remote system, shown as on-site system 260 (e.g., in a clubhouse of a golf course, on the golf course, etc.). In some embodiments, the remote systems 240 include only one of the off-site server 250 or the on-site system 260. As shown in FIG. 3, (a) the off-site server 250 includes a processing circuit 252, a memory 254, and a communications interface 256 and (b) the on-site system 260 includes a processing circuit 262, a memory 264, and a communications interface 266.

According to an exemplary embodiment, the remote systems 240 (e.g., the off-site server 250 and/or the on-site system 260) are configured to communicate with the vehicles 10 and/or the user sensors 220 via the communications network 210. By way of example, the remote systems 240 may receive the vehicle data from the vehicles 10 and/or the operator data from the user sensors 220. The remote systems 240 may be configured to perform back-end processing of the vehicle data and/or the operator data. The remote systems 240 may be configured to monitor various global positioning system ("GPS") information and/or real-time kinematics ("RTK") information (e.g., position/location, speed, direction of travel, geofence related information, etc.) regarding the vehicles 10 and/or the user sensors 220. The remote systems 240 may be configured to transmit information, data, commands, and/or instructions to the vehicles 10. By way of example, the remote systems 240 may be configured to transmit GPS data and/or RTK data based on the GPS information and/or RTK information to the vehicles 10 (e.g., which the vehicle control systems 100 may use to make control decisions). By way of another example, the remote systems 240 may send commands or instructions to the vehicles 10 to implement.

According to an exemplary embodiment, the remote systems 240 (e.g., the off-site server 250 and/or the on-site system 260) are configured to communicate with the user portal 230 via the communications network 210. By way of example, the user portal 230 may facilitate (a) accessing the remote systems 240 to access data regarding the vehicles 10 and/or the operators thereof and/or (b) configuring or setting operating parameters for the vehicles 10 (e.g., geofences, speed limits, times of use, permitted operators, etc.). Such operating parameters may be propagated to the vehicles 10 by the remote systems 240 (e.g., as updates to settings) and/or used for real time control of the vehicles 10 by the remote systems 240.

Steering Assistance Alteration in Accordance With Vehicle Parameters

According to an exemplary embodiment, the vehicle control system 100 (e.g., vehicle controller, etc.) and/or the remote systems 240 are configured to acquire vehicle parameters and generate countermeasures in accordance with the vehicle parameters. The countermeasures may include altering the steering assistance provided to the steering wheel 42. Generally, the steering assistance alterations, as described in greater detail herein, are configured to provide encouragement to a user to perform desired behavior, may protect turf, may prevent understeer situations (e.g., providing more assist in a direction encourages a user to travel in the direction of more assist, etc.), and/or may assist operators with disabilities. Further, it should be understood that any of the functions or processes described herein with respect to the site monitoring and control system 200 may be performed by the vehicle control system 100 and/or the remote systems 240. By way of another example, data collection may be performed by the vehicle control system 100 and data analytics may be performed by the remote systems 240. By way of yet another example, data collection may be performed by the vehicle control system 100, a first portion of data analytics may be performed by the vehicle control system 100, and a second portion of data analytics may be performed by the remote systems 240. By way of still another example, a first portion of data collection may be performed by the vehicle control system 100, a second portion of data collection may be performed by the remote systems 240, and data analytics may be performed by the vehicle control system 100 and/or the remote systems 240. The steering assistance alteration in accordance with vehicle parameters will be described herein in the context of FIGS. 5-8.

Figure 5:
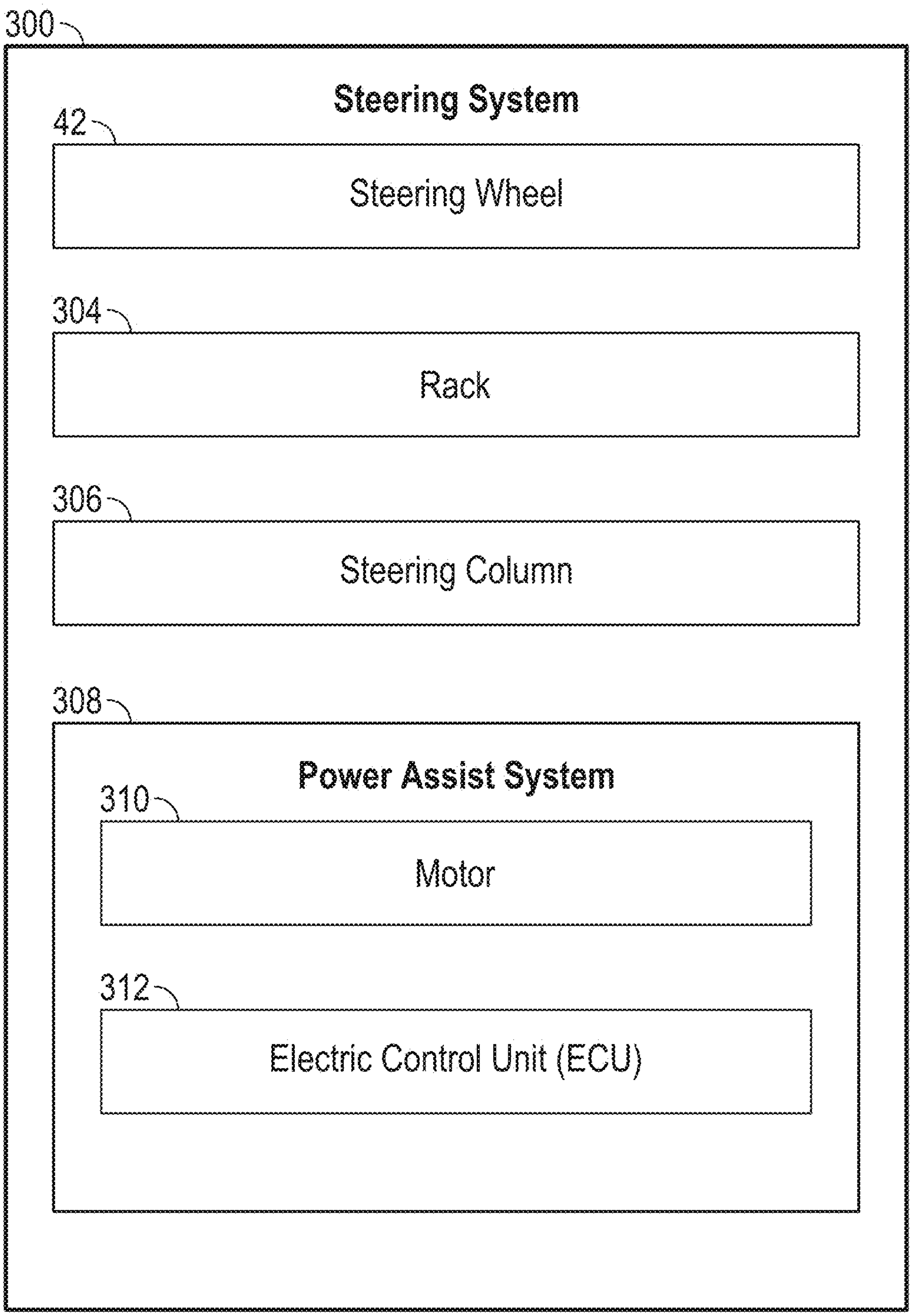
FIG. 5 is a schematic block diagram of a steering system of the vehicle of FIG. 1, according to an exemplary embodiment.

As shown in FIG. 5, the vehicle 10 includes a steering control system, shown as steering system 300. The steering system 300 includes the steering wheel 42, a rack and pinion system, shown as rack 304, a column, shown as steering column 306, and an assisted steering system, shown as power assist system 308. The power assist system 308 includes an actuator (e.g., an electric actuator), shown as motor 310, and a control unit, shown as electric control unit ("ECU") 312. The steering wheel 42 is configured to receive an input (e.g., a torque, a force, etc.) from a user (e.g., a driver, a golfer, a maintenance worker, etc.) to create a rotational motion of the steering wheel 42. The steering column 306 is coupled to the steering wheel 42, and the rotational motion of the steering wheel 42 is transmitted through the steering column 306 to the rack 304. The rack 304 is configured to convert the rotational input from the steering column 306 into a lateral movement. The rack 304 is configured to pivot tractive elements of at least one of the tractive assemblies 56, 58 (e.g., via coupling of the rack 304 with tie rods, the tie rods with steering knuckles, and the steering knuckles with the tractive assemblies 56, 58, etc.) in a direction reflective of the input from the user to the steering wheel 42. The tractive assemblies 56, 58 are configured driven by the prime mover 52 and are configured to be pivoted by the steering system 300.

In some embodiments, the power assist system 308 includes a rack-to-rack range of 180 degrees (e.g., a half turn rack-to-rack, etc.). In some embodiments, the rack-to-rack range is less than 180 degrees or greater than 180 degrees. In the illustrated embodiment, the power assist system 308 allows the lock-to-lock range of the steering wheel 42 to be less than three rotations. For example, in industrial vehicles, the power assist system 308 may allow the lock-to-lock to be less than three rotations for navigating a tight area faster (e.g., for turning around in a factory, etc.). In some embodiments, the lock-to-lock range of the steering wheel 42 is greater than three rotations or less than three rotations.

The power assist system 308 is configured to provide steering assistance (e.g., power steering, etc.) to the steering wheel 42. The steering assistance is an increase in a torque provided to the steering wheel 42 by the power assist system 308. The torque is provided by the motor 310 of the power assist system 308, and the motor 310 is controlled by the ECU 312. Increasing the torque provided to the steering wheel 42 in a first direction when the user is turning the steering wheel 42 in the first direction reduces the physical effort required by the user. However, decreasing the torque provided to the steering wheel 42 in the first direction or providing torque in an opposing second direction may increase the physical effort required by the user. Increasing the steering assistance in first direction and decreasing the steering assistance in the second direction may encourage a user to turn in the first direction. In some embodiments, the steering assistance is decreased in both the first direction and the second direction, which encourages the user to refrain from turning (e.g., refrain from performing a doughnut, etc.).

In some embodiments, the power assist system 308 provides a high resistance to prevent the steering wheel 42 from turning any farther. The steering assistance may prevent understeering and/or oversteering situations (e.g., to protect turf, to prevent spinning, etc.). The ECU 312 is configured to communicate with a controller (e.g., the site monitoring and control system 200, the vehicle control system 100, the remote systems 240, etc.) to determine when the steering assist should be increased or decreased, and in which direction. It should be understood that another power assist system 308 may perform the method described herein. For example, the power assist system 308 may be a hydraulic system, and the ECU 312 may control a pump, where the pump generates pressure generate steering assistance. In another example, the power assist system 308 may be an electro-hydraulic system.

Figure 6:
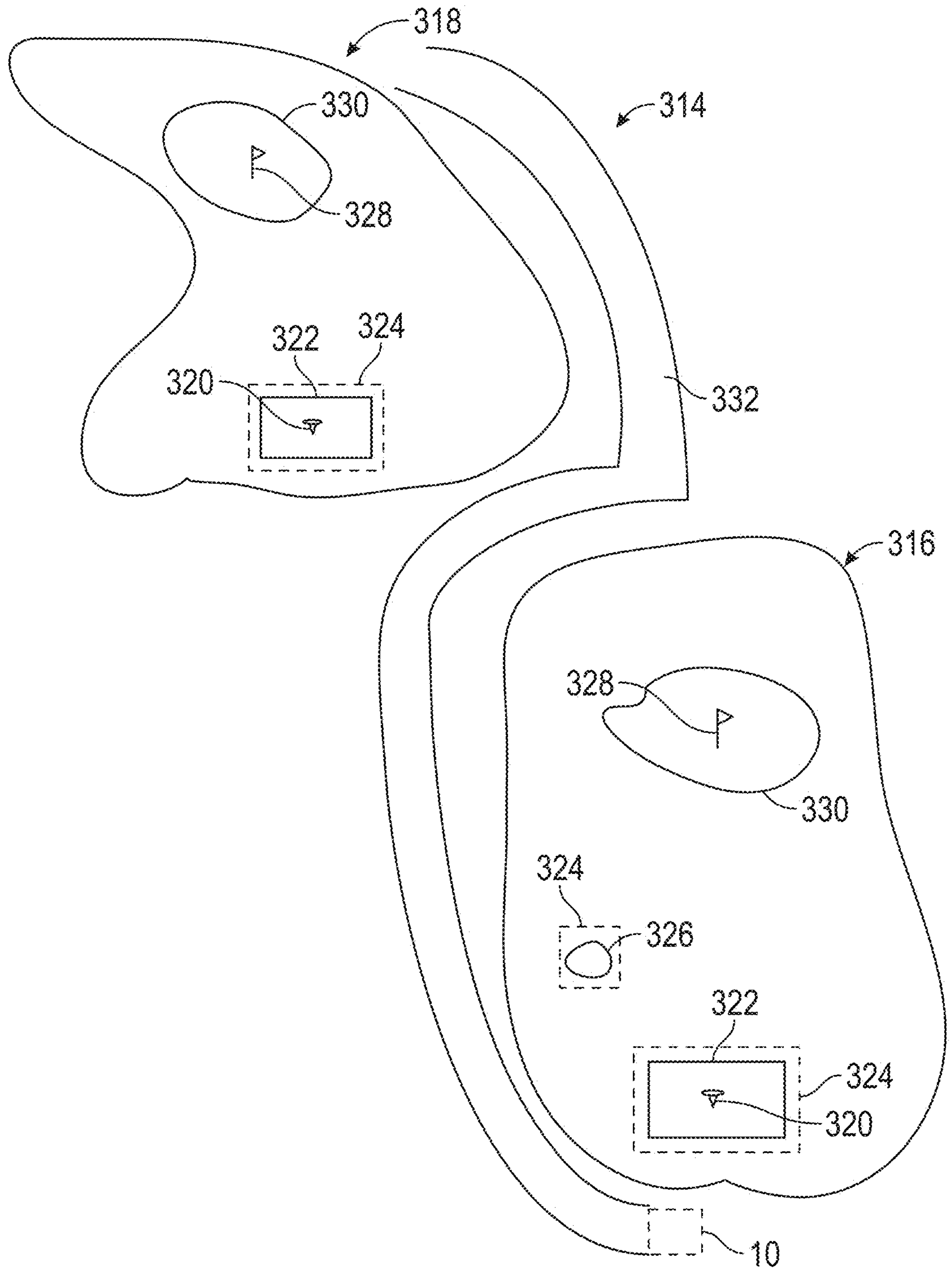
FIG. 6 is a schematic view of a portion of a golf course, according to an exemplary embodiment.

As shown in FIG. 6, a site, shown as golf course 314, includes one or more holes, shown as first hole 316 and second hole 318. The first hole 316 of the golf course 314 includes a tee, shown as tee 320, a tee box, shown as first tee box 322, one or more restricted operation areas (e.g., a water hazard, woods, fescue, non-playable area, area under repair, etc.), shown as restricted area 324, a pins, shown as pin 328, the vehicle 10, a green, shown as green 330, and one or more hazards, shown as hazard 326. The second hole 318 also includes a tee 320, a tee box 322, restricted area 324, pin 328, and green 330. The golf course 314 also includes a path 332 extending between and along the first hole 316 and the second hole 318 and a vehicle 10 traveling along the path 332. In other embodiments the golf course 314 includes more than two holes (e.g., a nine-hole course, an eighteen-hole course, etc.), more than two tees, more than two pins, more than two putting greens, more than one hazard, more than two tee boxes, more than one vehicle 10, and more than one path 332.

Figure 7:
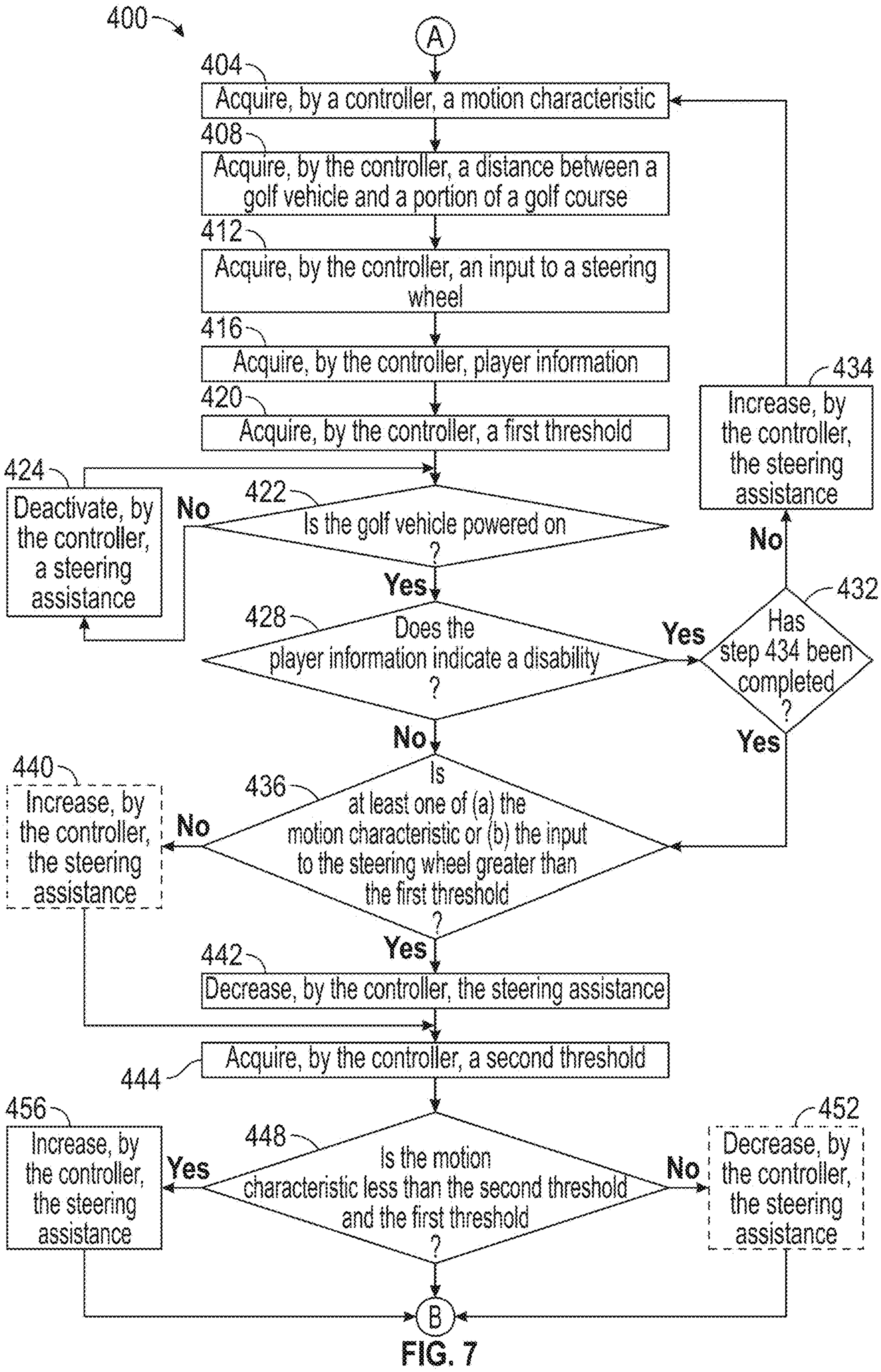
FIGS. 7 and 8 are flow diagrams of a method for acquiring a vehicle parameter and implementing a countermeasure to alter the steering assistance provided to a steering wheel of the vehicle, according to an exemplary embodiment.
Figure 8:
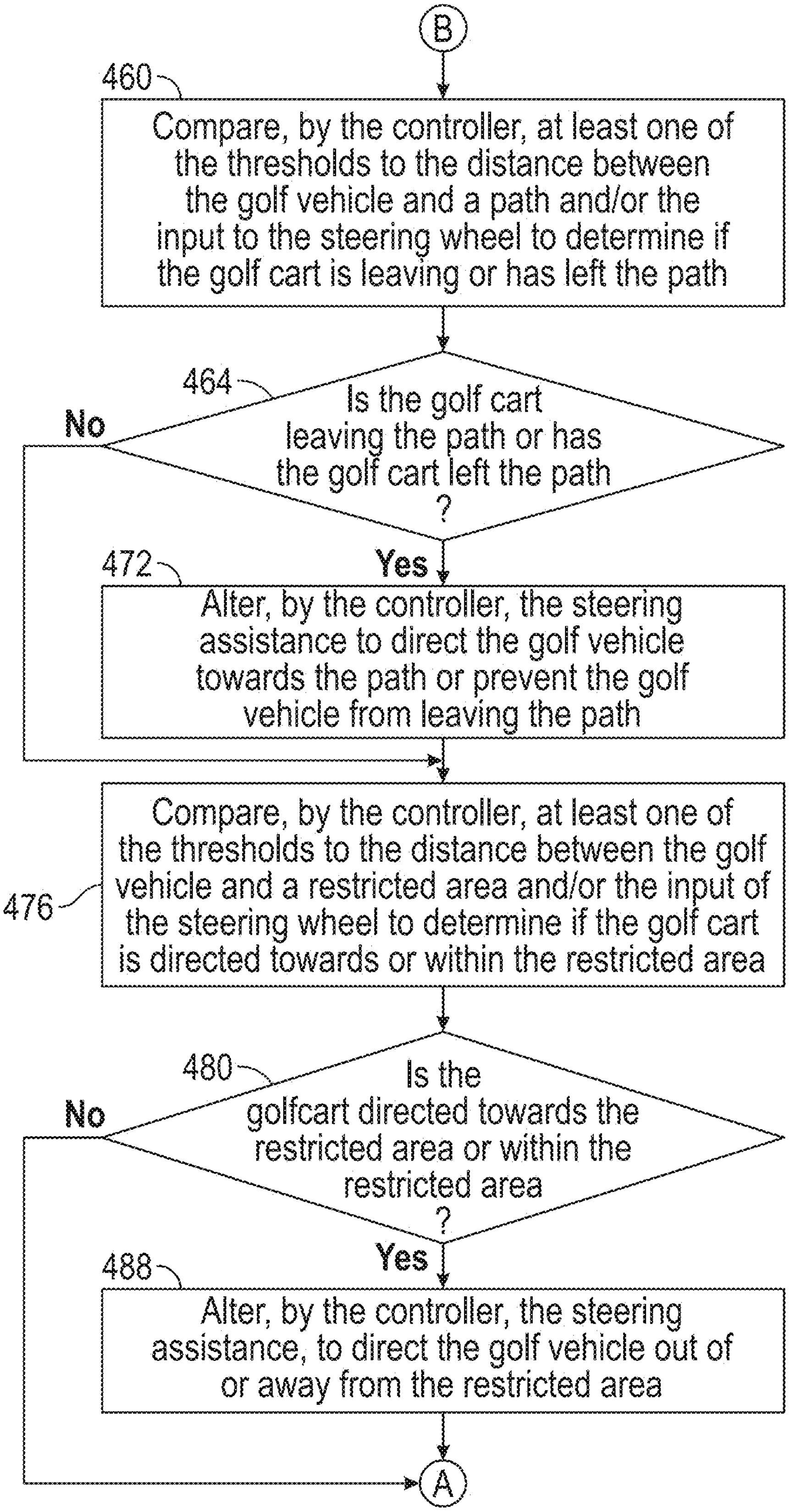

FIGS. 7 and 8 show a method 400 for acquiring a vehicle parameter and implementing a countermeasure to alter the steering assistance provided to the steering wheel 42 of the vehicle 10. The method 400 may be performed by the site monitoring and control system 200, the vehicle control system 100, the remote systems 240, and/or the ECU 312.

At step 404, at least one controller (e.g., the electric control unit 312, the site monitoring and control system 200, the vehicle control system 100, the remote systems 240, etc.) is configured to acquire a motion characteristic (e.g., a first parameter, etc.) of the vehicle 10. The motion characteristic may be acquired from the sensor 90 or GPS data acquired by a GPS device (e.g., a user sensor 220, a vehicle GPS of the vehicle 10, etc.). The motion characteristic may include at least one of a speed of the vehicle 10, an acceleration of the vehicle 10, a speed of the tractive assemblies 56, 58, a speed of the prime mover 52 (e.g., the motor 53), an acceleration of the prime mover 52, an acceleration of the tractive assemblies 56, 58, a torque of the prime mover 52, and/or a current draw of the prime mover 52. The motion characteristic may also indicate a path of travel or a predicted path of travel of the vehicle 10 (e.g., according to the location of the vehicle 10 over time, etc.).

At step 408, the controller is configured to acquire a distance between the vehicle 10 and a portion of the golf course 314 (e.g., a second parameter of the vehicle 10, etc.) or a relative location between the vehicle 10 and a portion of the golf course 314. In some embodiments, the distance is between the vehicle 10 and a restricted area 324. In some embodiments, the distance is between the vehicle 10 and the path 332. In some embodiments, the controller acquires multiple distances between multiple portions of the golf course 314 (e.g., a first distance between the vehicle 10 and a first restricted area 324, a second distance between the vehicle 10 and a second restricted area 324, a third distance between the vehicle 10 and the path 332, etc.). The distance between the vehicle 10 and a portion of the golf course 314 may be determined from directional geofences (e.g., restricted area 324, etc.) arranged around the golf course 314 and/or GPS data acquired by a GPS device (e.g., a user sensor 220, a vehicle GPS of the vehicle 10, etc.).

At step 412, the controller is configured to acquire an input to the steering wheel 42 (e.g., a third parameter of the vehicle 10, etc.). The input to the steering wheel 42 includes at least one of a torque exerted on the steering wheel 42, a force exerted on the steering wheel 42, an angular velocity of the steering wheel 42, an angular acceleration of the steering wheel 42, an angular jerk of the steering wheel 42, and/or an amount of angular rotation of the steering wheel 42. The input to the steering wheel 42, in addition to the distance between the vehicle 10 and a portion of the golf course 314 acquired in step 404 and/or the motion characteristic acquired in step 408, may indicate a predicated path of travel of the vehicle 10. For example, if the vehicle 10 is located on the path 332, the input to the steering wheel 42 directs the steering wheel 42 a full turn clockwise, and the GPS device indicates the path 332 continues in a straight line instead of curving or turning, the predicted path may indicate the vehicle 10 is leaving the path 332.

At step 416, the controller is configured to acquire player information. The player information may be acquired from the player or from an online database (e.g., the DMV, local court systems, internal records at the golf course, weather records, etc.). The player information may include information on the past history of the player at the golf course. For example, the player information may indicate the number and severity of warnings given in the past regarding driving behavior. The number and severity of warnings may also indicate which hole the warnings were given at, which location on the hole the warning was given (e.g., on a hill, within or near a restricted area 324, etc.), and/or the environmental conditions of the hole (e.g., precipitation, snow, etc.). The player information may also include recorded accident information. For example, the player information may include vehicle (e.g., automobile, golf cart, boating, etc.) accidents and the severity and frequency of the accidents. The player information may also provide an indication of the player having a disability. For example, the player information may indicate of a course modification in the past or a request to accommodate a disability. In another example, the player information may indicate if a specific disability friendly vehicle 10 was requested. In another example, the operator interface 48 and/or the user device 232 may prompt the player to indicate if they would like to request disability accommodations.

At step 420, the controller is configured to acquire a first threshold. The first threshold includes a threshold of a motion characteristic of the vehicle 10, a threshold of an input to the steering wheel 42, and/or a threshold of a distance between the vehicle 10 and a portion of golf course 314. In some embodiments, the threshold is predefined. By way of example, the predefined threshold may be preset by a manufacturer, golf course employee, or operator in accordance with a desired safety factor, anticipated terrain, weather, the frequency, and location of course accidents and/or player information. For example, the controller may acquire current or predicted environmental conditions (e.g., precipitation conditions, etc.) for the next twenty-four hours. When the level of precipitation is predicted to be high during the next twenty-four hours, the threshold may be different (e.g., lower) than the threshold when there is no expected precipitation during the next twenty-four hours. In some embodiments, the threshold is dynamically adjusted. For example, the controller may repeatedly measure or acquire precipitation data, terrain data, and/or vehicle location data while the vehicle 10 is in use. The threshold may be dynamically adjusted in accordance with changes to these factors (e.g., the vehicle 10 leaves the gravel path and is on grass, precipitation occurs, the level of precipitation changes, the vehicle 10 has left the path 332 multiple instances during a round, etc.).

At step 422, the controller is configured to determine if the vehicle 10 is powered on. If the controller determines the vehicle 10 is powered off, the controller is configured to proceed to step 424. At step 424, the controller is configured to deactivate the steering assistance and proceed to step 422. In some embodiments, step 424 is omitted, such as in when the vehicle 10 is being manually pushed or towed to a specific location within an enclosed area (e.g., within a storage shed, within a manufacturing plant, etc.). If the controller determines the vehicle 10 is powered on, then the control system is configured to proceed to step 428.

At step 428, the controller is configured to determine if the player information indicates a disability. If the controller determines the player information indicates a disability, then the controller is configured to proceed to step 432. At step 432, the controller is configured to determine if step 434 has been completed. If the controller determines step 434 has not been completed, the controller is configured to proceed to step 434. At step 434, the controller is configured to increase the steering assistance and proceed to step 404. If the controller determines step 434 has been completed, the controller is configured to proceed to step 436. This process allows the controller to detect a disability and increase the steering assistance, but still encourage desired driving practices.

In some embodiments, step 428 proceeds to step 436 instead of step 432 when the player indicates to the operator interface 48 and/or the user device 232 that accommodations are not required. In some embodiments, if the player data also indicates the player is a reckless driver, the controller proceeds to step 436 instead of step 432. In some embodiments, after the controller proceeds to step 434, the controller proceeds to step 422 and proceeds only between step 422 and step 424. For example, after increasing the steering assistance in step 434, the controller monitors if the vehicle 10 is powered off in step 422, if the vehicle 10 is powered off, the controller proceeds to step 424. However, if the vehicle 10 is powered on, the controller remains in step 422 until the vehicle 10 is powered off. If the controller determines the player information does not indicate a disability, then the controller system is configured to proceed to step 436.

At step 436, the controller is configured to determine if at least one of (a) the motion characteristic or (b) the input to the steering wheel 42 is greater than the first threshold. If the controller determines neither of (a) the motion characteristic or (b) the input to the steering wheel 42 is greater than the first threshold, the controller is configured to proceed to step 440. At step 440, the controller is configured to increase the steering assistance (e.g., generate a countermeasure, adjust the steering assistance, etc.). For example, the speed of the motor 53 may be less than the first threshold, indicating the vehicle 10 is traveling at a low speed. The controller may increase the steering assistance to encourage the desired driving practices (e.g., the countermeasure causes the steering wheel 42 to be easier to turn at lower speeds, etc.). In another example, the input to the steering wheel 42 may be less than the first threshold (e.g., indicating the driver is not attempting to perform doughnuts, etc.). The controller may increase the steering assistance to the steering wheel 42 to encourage the desired driving practice (e.g., the countermeasure causes the steering wheel 42 to be easier to turn when the driver is not attempting to spin the vehicle 10, etc.) In some embodiments, step 440 is optional. For example, the controller may only be programmed to monitor for undesired driving practices and deter the undesired driving practices.

If the controller determines at least one of (a) the motion characteristic or (b) the input to the steering wheel 42 is greater than the first threshold, the controller is configured to proceed to step 442. At step 442, the controller is configured to decrease the steering assistance (e.g., generate a countermeasure based on the vehicle 10 parameter, adjust the steering assistance, etc.). In some embodiments, the steering assistance in a first rotational direction is greater than the steering assistance in a second rotation direction. For example, the steering assistance of the steering wheel 42 in a first rotational direction may be decreased when the input is greater than the first threshold in the first rotational direction. In another example, the steering assistance of the steering wheel 42 in a second rotational direction may be decreased when the input is greater than the first threshold in the second rotational direction. In some embodiments, the steering assistance in both rotational directions may be decreased (e.g., when the vehicle 10 speed is above the first threshold, etc.). For example, decreasing the steering assistance in both rotational directions may encourage a user to drive in a straight line along the path 332.

At step 444, the controller is configured to acquire a second threshold. In some embodiments, the threshold is predefined, as described above. In some embodiments, the threshold is dynamically adjusted, as described above. In some embodiments, the second threshold less than the first threshold (e.g., the first threshold is an upper limit, and the second threshold is a lower limit, etc.). For example, the first threshold may be a first speed of a tractive assembly 56, 58 and the second threshold may be a second speed of a tractive assembly 56, 58 where the second speed is lower than the first speed. In another example, the first threshold may be a first distance between the vehicle 10 and the restricted area 324, and the second threshold may be a second distance between the vehicle 10 and the restricted area 324 (e.g., the first threshold is an upper distance limit and the second threshold is a lower distance limit, etc.).

In other embodiments, the second threshold is used for a comparison of a different characteristic than the first threshold. In this embodiment, the second threshold is greater than, equal to, or less than the first threshold. For example, the first threshold may be for comparison with a motion characteristic of the vehicle 10 and the second threshold may be for a comparison with an input to the steering wheel 42. In another example, the first threshold may be for a comparison with an input to the steering wheel 42 and the second threshold may be for a comparison with a distance between the vehicle 10 and a portion of golf course 314. In another example, the first threshold may be for a comparison with a distance between the vehicle 10 and a portion of golf course 314 and the second threshold may be for a comparison with a motion characteristic of the vehicle 10.

In some embodiments, the first threshold and the second threshold are from different categories of the same characteristic. For example, both thresholds may relate to the input to the steering wheel 42 (e.g., the first threshold is a torque input to the steering wheel 42 and the second threshold is an angular velocity of the steering wheel 42, etc.). In another example, both thresholds may relate to distances between the vehicle 10 and a portion of golf course 314 (e.g., the first threshold is a distance between the vehicle 10 and a first restricted area 324 and the second threshold is a distance between the vehicle 10 and a second restricted area 324, etc.). In another example, both thresholds may relate to motion characteristics of the vehicle 10 (e.g., the first threshold is an acceleration of the motor 53, and the second threshold is an acceleration of the tractive assembly 56, 58, etc.). In some embodiments, step 444 is omitted. For example, when the controller is configured develop a countermeasure in accordance with only an upper speed limit of the vehicle 10, step 444 may be omitted.

At step 448, the controller is configured determine if the motion characteristic is less than the second threshold and the first threshold. In some embodiments, when step 444 is omitted, at step 448 the controller is configured to determine if the motion characteristic is less than the first threshold. If the controller determines the motion characteristic is not less than the second threshold and the first threshold, the controller is configured to proceed to step 452. At step 452, the controller is configured to decrease the steering assistance. In some embodiments, step 452 is omitted, and if the controller determines the motion characteristic is less than the second threshold and the first threshold the controller is configured to proceed to step 460. If the controller determines the motion characteristic is less than the second threshold and the first threshold, the controller is configured to proceed to step 456. At step 456, the controller is configured to increase the steering assistance (e.g., generate a countermeasure based on the vehicle parameter 10, etc.). Steps 448 and 456 may be useful when maneuvering the vehicle 10 around in an enclosed area (e.g., a factory, a storage shed, etc.) and may assist a user in navigating tight areas more quickly.

At step 460, the controller is configured to compare at least one of the thresholds to a distance between the vehicle 10 and a path 332 and/or the input to the steering wheel 42 to determine if the vehicle 10 is leaving or has left the path 332. For example, the distance between the vehicle 10 and the path 332 may be greater than one of the thresholds, indicating the vehicle 10 has left the path 332. In another example, the distance between the vehicle 10 and the path 332 may be less than the first threshold and an input to the steering wheel 42 may be greater than the second threshold (e.g., the steering wheel 42 may be turning the tractive elements away from the direction the path 332 travels, etc.). At step 464 the controller is configured to determine if the vehicle 10 is leaving the path 332 or has left the path 332. If the controller does not determine the vehicle has left the path 332 or is leaving the path 332, the controller is configured to proceed to step 476.

If the controller determines the vehicle has left the path 332 or is leaving the path 332, the controller is configured to proceed to step 472. At step 472, the controller is configured to alter the steering assistance to direct the vehicle 10 towards the path 332 and/or prevent the vehicle 10 from leaving the path 332 (e.g., generate a countermeasure, if cart path only rules are being implemented, etc.). The controller is configured to adjust the steering assistance when the vehicle 10 is attempting to leave the path 332 to make it more difficult for the vehicle 10 to leave the path 332 and is configured to adjust the steering assistance when the vehicle 10 is off the path 332 to direct the vehicle 10 towards the path 332. For example, the controller is configured to decrease the steering assistance in a first rotational direction when the distance is greater than one of the thresholds and the first rotational direction directs the vehicle 10 away from the path 332. In another example, the controller is configured to decrease the steering assistance in a second rotational direction when the distance is greater than one of the thresholds and the second rotational direction directs the vehicle 10 away from the path 332. In another example, the controller is configured to decrease the steering assistance in the second rotational direction when the distance is less than one of the thresholds and the second rotational direction directs the vehicle 10 off the path 332. In another example, the controller is configured to decrease the steering assistance in the first rotational direction when the distance is less than one of the thresholds and the first rotational direction directs the vehicle 10 off the path. In another example, the controller is configured to increase the steering assistance of the steering wheel when the vehicle 10 is directed towards the path (e.g., the controller is configured to increase the steering assistance in the first rotational direction when the first rotational direction directs the vehicle 10 towards the path 332, the controller is configured to increase the steering assistance in the second rotational direction when the second rotational direction directs the vehicle 10 towards the path 332, etc.). In another example, the controller is configured to decrease the steering assistance in the first rotation direction and the second rotational direction when the distance is less than the thresholds to encourage the user to drive in a straight line.

At step 476, the controller is configured to compare one or more of the thresholds to a distance between the vehicle 10 and a restricted area 324 and/or the input to the steering wheel 42 to determine if the vehicle 10 is directed towards or within the restricted area 324. For example, the distance between the vehicle 10 and the restricted area 324 may be less than one of the thresholds, indicating the vehicle 10 is within the restricted area 324. In another example, the distance between the vehicle 10 and the restricted area 324 may be greater than a first threshold and an input to the steering wheel 42 may be greater than the second threshold, indicating the vehicle 10 is traveling towards the restricted area 324 (e.g., the steering wheel 42 may be turning the tractive elements towards the restricted area 324, etc.).

At step 480, the controller is configured to determine if the vehicle 10 is directed towards the restricted area 324 or is within the restricted area 324. If the controller determines the vehicle 10 is not directed towards the restricted area 324 and is not within the restricted area 324, the controller is configured to proceed to step 404. If the controller determines the vehicle 10 is directed towards the restricted area 324 or is within the restricted area 324, the controller is configured to proceed to step 488. At step 488, the controller is configured to implement a countermeasure (e.g., alter the steering assistance, provide a signal to the power assist system 308, etc.) to direct the vehicle 10 out of or away from the restricted area 324 (e.g., generate a countermeasure, make it more difficult for the vehicle 10 to enter the restricted area 324, etc.).

In some embodiments, the countermeasure comprises decreasing the steering assistance when the vehicle 10 is directed towards the restricted area 324 or is within the restricted area 324. For example, the controller may decrease the steering assistance in a first rotational direction of the steering wheel 42 when the distance is greater than one of the thresholds and the first rotational direction directs the vehicle 10 towards the restricted area 324. In another example, the controller may decrease the steering assistance in the first rotational direction of the steering wheel 42 when the distance is less than the threshold and the first rotational direction directs the vehicle 10 farther within the restricted area. In another example, the controller may decrease the steering assistance in a second rotational direction of the steering wheel 42 when the distance is greater than the threshold and the second rotational direction directs the vehicle 10 towards the restricted area 324. In another embodiment, the controller decreases the steering assistance in the second rotational direction of the steering wheel 42 when the distance is less than the threshold and the second rotational direction directs the vehicle 10 farther within the restricted area 324. In some embodiments, the steering assistance is lower when the vehicle 10 is directed towards the restricted area 324 than when the vehicle 10 is directed away from the restricted area 324, the steering assistance configured to direct the vehicle 10 out of or away from the restricted area 324 (e.g., the steering assistance is decreased when the vehicle 10 is directed towards the restricted area 324, the steering assistance is increased when the vehicle 10 is directed out of the restricted area 324, etc.). After step 488 or step 480, the controller is configured to proceed to step 404.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent, or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single-or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle control system 100, etc.) and the fleet monitoring and control system 200 (e.g., the remote systems 240, the user portal 230, the user sensors 220, etc.) as shown in the various exemplary embodiments is illustrative only. Additionally, any element disclosed in one embodiment may be incorporated or utilized with any other embodiment disclosed herein.

The invention claimed is:

1. A golf vehicle system comprising:
- a golf vehicle including:
  - a chassis;
  - a prime mover;
  - a steering system comprising:
    - a steering wheel; and
    - a power assist system configured to provide steering assistance to the steering wheel;
  - a plurality of tractive elements, at least one of the plurality of tractive elements configured to be pivoted by the steering system; and
  - a sensor configured to facilitate detecting a golf vehicle parameter; and
- a control system configured to:
  - acquire the golf vehicle parameter, the golf vehicle parameter including a distance or a relative location between the golf vehicle and a restricted operation area of a golf course;
  - generate a countermeasure based on the golf vehicle parameter, the countermeasure including a change in the steering assistance provided to the steering wheel; and
  - providing a signal to the power assist system to implement the countermeasure;
- wherein implementing the countermeasure includes adjusting the steering assistance when the golf vehicle is directed towards the restricted operation area to make it more difficult for the golf vehicle to enter into the restricted operation area.

2. The golf vehicle system of claim 1, wherein the countermeasure includes an increase in a torque provided to the steering wheel by the power assist system.

3. The golf vehicle system of claim 1, wherein the steering assistance in a first rotational direction is greater than the steering assistance in a second rotational direction.

4. The golf vehicle system of claim 1, wherein the golf vehicle parameter includes a motion characteristic including at least one of a tractive element speed, a prime mover speed, a motor acceleration, a tractive element acceleration, a prime mover torque, or a prime mover current draw.

5. The golf vehicle system of claim 1, wherein the golf vehicle parameter includes at least one of (a) a motion characteristic or (b) an input to the steering wheel and implementing the countermeasure includes decreasing the steering assistance when at least one of (a) the motion characteristic or (b) the input is greater than a threshold.

6. The golf vehicle system of claim 5, wherein:
- the threshold is a first threshold;
- the control system is configured to:
  - acquire a second threshold that is less than the first threshold; and
- implementing the countermeasure comprises:
  - decreasing the steering assistance when the motion characteristic is greater than the first threshold; and
  - increasing the steering assistance when the motion characteristic is less than the second threshold.

7. The golf vehicle system of claim 1, wherein:
- the steering assistance is lower when the golf vehicle is directed towards the restricted operation area than when the golf vehicle is directed away from the restricted operation area.

8. The golf vehicle system of claim 7, wherein the steering assistance is configured to direct the golf vehicle out of or away from the restricted operation area.

9. The golf vehicle system of claim 1, wherein:
- the golf vehicle parameter includes the distance or the relative location between the golf vehicle and a path of the golf course; and
- the control system is configured to:
  - adjust the steering assistance of the steering wheel when the golf vehicle is attempting to leave the path to make it more difficult for the golf vehicle to leave the path; and
  - adjust the steering assistance of the steering wheel when the golf vehicle is off the path to direct the golf vehicle towards the path.

10. The golf vehicle system of claim 1, wherein the golf vehicle parameter includes an input to the steering wheel, and the input includes at least one of a torque exerted on the steering wheel, a force exerted on the steering wheel, an angular velocity of the steering wheel, an angular acceleration of the steering wheel, or an angular jerk of the steering wheel.

11. The golf vehicle system of claim 1, wherein the golf vehicle parameter includes an input to the steering wheel, and wherein the control system is configured to:
- decrease the steering assistance of the steering wheel in a first rotational direction when the input is greater than a threshold in the first rotational direction and the first rotational direction directs the golf vehicle towards the restricted operation area or away from a path; and
- decrease the steering assistance of the steering wheel in a second rotational direction when the input is greater than the threshold in the second rotational direction and the second rotational direction directs the golf vehicle towards the restricted operation area or away from the path.

12. The golf vehicle system of claim 11, wherein the control system is configured to:

increase the steering assistance of the steering wheel in the first rotational direction when the input is less than the threshold in the first rotational direction and the first rotational direction directs the golf vehicle away from the restricted operation area or towards the path; and increase the steering assistance of the steering wheel in the second rotational direction when the input is less than the threshold in the second rotational direction and the second rotational direction directs the golf vehicle away from the restricted operation area or towards the path.

13. The golf vehicle system of claim 1, wherein the control system is configured to:

acquire player information; and adjust the steering assistance based on the player information.

14. The golf vehicle system of claim 13, wherein the player information includes an indication of a disability.

15. The golf vehicle system of claim 1, wherein the control system is further configured to deactivate the steering assistance when the golf vehicle is powered off.

16. The golf vehicle system of claim 1, wherein the control system includes at least one of (a) a first processing circuit located on the golf vehicle or (b) a second processing circuit located remote from the golf vehicle.

17. The golf vehicle system of claim 1, wherein a lock-to-lock range of the steering wheel is less than three rotations.

18. A vehicle system comprising:

a non-transitory computer-readable medium having instructions stored thereon that, when executed by one or more processors, cause the one or more processors to:

acquire a golf vehicle parameter including at least one of (a) a motion characteristic, (b) a distance or a relative location between a golf vehicle and a restricted operation area of a portion of a golf course, or (c) an input to a steering wheel;

generate a countermeasure to change a steering assistance provided to the steering wheel based on the golf vehicle parameter; and implement the countermeasure, wherein implementing the countermeasure includes:

adjusting the steering assistance when at least one of (a) the motion characteristic or (b) the input is greater than a threshold;

adjusting the steering assistance of the steering wheel to prevent the golf vehicle from leaving a path of the golf course or to direct the golf vehicle towards the path;

decreasing the steering assistance of the steering wheel in a first rotational direction when the input is greater than the threshold in the first rotational direction and the first rotational direction directs the golf vehicle towards the restricted operation area or away from the path; and decreasing the steering assistance of the steering wheel in a second rotational direction when the input is greater than the threshold in the second rotational direction and the second rotational direction directs the golf vehicle towards the restricted operation area or away from the path.

19. A vehicle system comprising:

a non-transitory computer-readable medium having instructions stored thereon that, when executed by one or more processors, cause the one or more processors to:

acquire a golf vehicle parameter including at least one of (a) a motion characteristic, (b) a distance or relative location between a golf vehicle and a portion of a golf course, or (c) an input to a steering wheel;

acquire player information, the player information including at least one of (a) a history of warnings or rule violations of a player at the golf course or (b) recorded accident information of the player at the golf course;

generate a countermeasure based on the player information and the golf vehicle parameter, the countermeasure including a change in steering assistance provided to the steering wheel;

implement the countermeasure; and deactivate the steering assistance when the golf vehicle is powered off.

20. The vehicle system of claim 19, wherein:

the golf vehicle parameter includes the distance or the relative location between the golf vehicle and a restricted operation area of the golf course; and implementing the countermeasure includes adjusting the steering assistance when the golf vehicle is directed towards the restricted operation area to make it more difficult for the golf vehicle to enter into the restricted operation area.

* * * * *